United States Patent
Reichelt et al.

(10) Patent No.: US 9,896,577 B2
(45) Date of Patent: Feb. 20, 2018

(54) POLYPROPYLENE BLEND WITH IMPROVED BALANCE BETWEEN SIT AND MELTING POINT

(71) Applicant: Borealis AG, Vienna (AT)

(72) Inventors: Kristin Reichelt, Neuhofen/Krems (AT); Luigi Resconi, Ferrara (IT)

(73) Assignee: Borealis AG (AT)

( * ) Notice: Subject to any disclaimer, the term of this patent is extended or adjusted under 35 U.S.C. 154(b) by 154 days.

(21) Appl. No.: 14/353,734

(22) PCT Filed: Oct. 31, 2012

(86) PCT No.: PCT/EP2012/071528
§ 371 (c)(1),
(2) Date: Apr. 23, 2014

(87) PCT Pub. No.: WO2013/064522
PCT Pub. Date: May 10, 2013

(65) Prior Publication Data
US 2015/0051346 A1    Feb. 19, 2015

(30) Foreign Application Priority Data
Oct. 31, 2011 (EP) .................................. 11187284

(51) Int. Cl.
*C08L 23/14* (2006.01)
*C08L 23/10* (2006.01)
*C09D 123/14* (2006.01)

(52) U.S. Cl.
CPC ............... *C08L 23/14* (2013.01); *C08L 23/10* (2013.01); *C08L 23/142* (2013.01); *C09D 123/14* (2013.01); *C08L 2205/02* (2013.01); *C08L 2205/025* (2013.01); *C08L 2666/06* (2013.01)

(58) Field of Classification Search
CPC ........ C08L 23/10; C08L 23/14; C08L 23/142; C08L 2205/025

USPC .......................................................... 525/240
See application file for complete search history.

(56) References Cited

U.S. PATENT DOCUMENTS

| | | | |
|---|---|---|---|
| 2008/0268221 A1* | 10/2008 | Inoue ..................... | B32B 27/32 428/220 |
| 2010/0249329 A1 | 9/2010 | Grein | |
| 2011/0020619 A1* | 1/2011 | Van Den Bossche .... | B32B 7/12 428/201 |
| 2012/0249329 A1 | 10/2012 | Sacchetti | |
| 2013/0203931 A1* | 8/2013 | Paavilainen ............... | C08J 5/18 524/528 |

FOREIGN PATENT DOCUMENTS

| | | |
|---|---|---|
| CN | 101233185 A | 7/2008 |
| CN | 101501110 A | 8/2009 |
| EP | 0936247 A1 | 8/1999 |
| EP | 2014714 A1 | 1/2009 |
| EP | 2386603 A1 | 11/2011 |
| WO | 2011064131 A1 | 6/2011 |
| WO | 2011131639 A1 | 10/2011 |
| WO | WO 2011/131639 A1 * | 10/2011 |

OTHER PUBLICATIONS

Chinese Search Report, Application 2012800462029, date unknown.
First Chinese Office Action, dated Jun. 15, 2015, Application 201280046202.9.

* cited by examiner

*Primary Examiner* — Roberto Rabago
(74) *Attorney, Agent, or Firm* — Tarolli, Sundheim, Covell & Tummino LLP

(57) ABSTRACT

Polymer composite comprising propylene copolymer composition having a comonomer content in the range of 2.5 to 10 wt. -%, the comonomers are $C_5$ to $C_{12}$ α-olefins, and a low-crystalline polymer having a melting temperature of below 120° C.,
wherein further said polymer composite has
(i) a melting temperature of at least 140° C., and
(ii) a heat sealing initiation temperature (SIT) of not more than 110° C.

14 Claims, No Drawings

POLYPROPYLENE BLEND WITH IMPROVED BALANCE BETWEEN SIT AND MELTING POINT

The present invention is directed to a new polymer composite, its manufacture and use.

Polypropylenes are suitable for many applications. For instance polypropylene is applicable in areas where sealing properties play an important role, like in the food packing industry. Irrespectively from the polymer type, a polymer must fulfill at best all desired end properties and additionally must be easily processable, i.e. must withstand stress. However, end properties and processing properties act often in a conflicting manner.

In many cases, the seal, which is formed between the surfaces to be sealed, is put under load while it is still warm. This means that the hot-tack properties of the polypropylene are crucial to ensure a strong seal is formed even before cooling. But not only the hot tack strength should be rather high but also the heat sealing initiation temperature should be rather low. By operating at lower temperature there is the benefit that the article to be sealed is not exposed to high temperature. There are also economic advantages since lower temperatures are of course cheaper to generate and maintain.

A further issue in the packing industry are the optical properties, i.e. the packing material shall have good optics.

Accordingly the object of the present invention is to provide a polymer composite with high hot tack strength and a low heat sealing initiation temperature (SIT). Additionally it is desired that the polymer composite has a rather high melting point to avoid stickiness problems and good optical properties.

The finding of the present invention is to provide a polymer composite comprising three different polymers, a polypropylene (A) with a rather low comonomer content, a propylene copolymer (B) having a higher comonomer content than polypropylene (A) and a low-crystalline polymer (C) having a crystallinity being lower than the polypropylene (A) and the propylene copolymer (B).

Accordingly the present invention is directed in a first embodiment to a polymer composite comprising
(a) a polypropylene (A) having a comonomer content of below 4.0 wt.-%, the comonomers are $C_5$ to $C_{12}$ α-olefins, and
(b) a propylene copolymer (B) having a comonomer content of 4.0 to 20.0 wt.-%, the comonomers are $C_5$ to $C_{12}$ α-olefins,
(c) a low-crystalline polymer (C) having a melting temperature of below 120° C.,
wherein further
(i) the weight ratio of the polypropylene (A) to the propylene copolymer (B) [(A)/(B)] is in the range of 20/80 to 80/20, preferably in the range of 30/70 to 70/30, and
(ii) preferably the polymer composite comprises 5 to 50 wt.-%, more preferably 7 to 40 wt.-%, based on the total amount of polymer composite of low-crystalline polymer (C).

The inventive composite is preferably obtained by mixing, preferably melt mixing, a mixture (M) comprising the polypropylene (A) and the propylene copolymer (B) with the low-crystalline polymer (C).

Accordingly the present invention can be also described as a polymer composite (second embodiment) comprising
(a) propylene copolymer composition (P) comprising
(a1) a polypropylene (A) having a comonomer content of below 4.0 wt.-%, the comonomers are $C_5$ to $C_{12}$ α-olefins, and
(a2) a propylene copolymer (B) having a comonomer content of 4.0 to 20.0 wt.-%, the comonomers are $C_5$ to $C_{12}$ α-olefins, and
(b) a low-crystalline polymer (C) having a melting temperature of below 120° C.,
wherein further
(i) the weight ratio of the polypropylene (A) to the propylene copolymer (B) [(A)/(B)] is in the range of 20/80 to 80/20, preferably in the range of 30/70 to 70/30, and
(ii) preferably the polymer composite comprises 5 to 50 wt.-%, more preferably 7 to 40 wt.-%, based on the total amount of polymer composite of low-crystalline polymer (C).

Preferably the weight ratio of the propylene copolymer composition (P) to the low-crystalline polymer (C) [(P)/(C)] of the $2^{nd}$ embodiment of the polymer composite is 95/5 to 50/50, more preferably 93/7 to 60/40.

It has surprisingly been found that such a polymer composite has on the one hand a low heat sealing initiation temperature (SIT) but on the other hand a rather high melting temperature and high hot tack force. Further the optical properties are enhanced to the state of the art polypropylenes used in this technical field.

Accordingly the instant invention covers additionally a polymer composite ($3^{rd}$ embodiment) comprising
(a) propylene copolymer composition (P) having a comonomer content in the range of 2.5 to 10 wt.-%, the comonomers are $C_5$ to $C_{12}$ α-olefins, and
(b) a low-crystalline polymer (C) having a melting temperature of below 120° C.,
wherein further said polymer composite has
(i) a melting temperature of at least 140° C., and
(ii) a heat sealing initiation temperature (SIT) of not more than 110° C.

Preferably the propylene copolymer composition (P) of the polymer composite of the $3^{rd}$ embodiment has
(a1) a polypropylene (A) having a comonomer content of below 4.0 wt.-%, the comonomers are $C_5$ to $C_{12}$ α-olefins, and
(a2) a propylene copolymer (B) having a comonomer content of 4.0 to 20.0 wt.-%, the comonomers are $C_5$ to $C_{12}$ α-olefins,
wherein further the weight ratio of the polypropylene (A) to the propylene copolymer (B) [(A)/(B)] is in the range of 20/80 to 80/20, preferably in the range of 30/70 to 70/30.

Preferably the weight ratio of the propylene copolymer composition (P) to the low-crystalline polymer (C) [(P)/(C)] of the $3^{rd}$ embodiment of the polymer composite is 95/5 to 50/50, more preferably 93/7 to 60/40.

Accordingly it is appreciated that the polymer composite of the $3^{rd}$ embodiment comprises 5 to 50 wt.-%, more preferably 7 to 40 wt.-%, based on the total amount of polymer composite, of low-crystalline polymer (C).

In the following the invention ($1^{st}$, $2^{nd}$, and $3^{rd}$ embodiment) is defined in more detail together.

As mentioned above the terms "mixture (M)" and "propylene copolymer composition (P)" are synonyms. The mixture (M) and the propylene copolymer composition (P), respectively, preferably comprises the polypropylene (A) and the propylene copolymer (B). In one preferred embodiment the polypropylene (A) and the propylene copolymer (B) are the only polymer components of the mixture (M) and of the propylene copolymer composition (P), respectively. It is especially preferred that the polypropylene (A) and the propylene copolymer (B) form one single phase.

The term "polymer composite" shall indicate that the composite comprises different polymers, i.e. the propylene copolymer composition (P), i.e. the polypropylene (A) and the propylene copolymer (B), and the low-crystalline polymer (C). In one preferred embodiment the propylene copolymer composition (P) and the low-crystalline polymer (C) are the only polymer components of the polymer composite. The different polymers, i.e. the propylene copolymer composition (P) and the low-crystalline polymer (C) are mixed, preferably melt mixed, obtaining thereby the instant polymer composite.

Preferably, the low-crystalline polymer (C) is not miscible with the propylene copolymer composition (P), i.e. the polypropylene (A) and the propylene copolymer (B), and thus forms a separate phase being dispersed in the propylene copolymer composition (P). The different phases are for instance visible by high resolution microscopy, like electron microscopy or atomic force microscopy, or by dynamic mechanical thermal analysis (DMTA).

The inventive polymer composite is featured by a rather high melting temperature. Accordingly it is appreciated that the inventive polymer composite has a melting temperature of more than 130.0° C., more preferably of at least 135° C., still more preferably of at least 140° C., yet more preferably of at least 145° C. Thus it is in particular appreciated that the melting temperature of the polymer composite is in the range of more than 130 to 165° C., more preferably in the range of 135 to 163° C., still more preferably in the range of 140 to 163° C., like in the range of 145 to 163° C.

Additionally it is appreciated that the inventive polymer composite has crystallization temperature of at least 88° C., more preferably of at least 90° C. Accordingly the polymer composite has preferably a crystallization temperature in the range of 88 to 110° C., more preferably in the range of 90 to 105° C.

A further characterizing feature of the inventive polymer composite is its rather low heat sealing initiation temperature (SIT). Accordingly it is preferred that the polymer composite of the instant invention has a heat sealing initiation temperature (SIT) of not more than 115° C., more preferably not more than 110° C., still more preferably of not more than 108° C., yet more preferably in the range of 90 to 115° C., still yet more preferably in the range of 90 to 110° C., like in the range of 90 to 108° C.

As mentioned above not only the heat sealing initiation temperature (SIT) shall be rather low but also the melting temperature shall be rather high. Accordingly the difference between the melting temperature and the heat sealing initiation temperature (SIT) shall be rather high. Thus it is preferred that the polymer composite fulfills the equation (I), more preferably the equation (Ia), still more preferably equation (Ib), $$Tm-SIT \geq 30° C. \quad (I),$$

$$Tm-SIT \geq 35° C. \quad (Ia),$$

$$Tm-SIT \geq 40° C. \quad (Ib),$$

wherein
Tm is the melting temperature given in centigrade [° C.] of the polymer composite,
SIT is the heat sealing initiation temperature (SIT) given in centigrade [° C.] of the polymer composite.

In another embodiment the polymer composite fulfills equation (Ic), more preferably equation (Id), $$60° C. \geq Tm-SIT \geq 30° C. \quad (Ic),$$

$$55° C. \geq Tm-SIT \geq 40° C. \quad (Id),$$

wherein
Tm is the melting temperature given in centigrade [° C.] of the polymer composite,
SIT is the heat sealing initiation temperature (SIT) given in centigrade [° C.] of the polymer composite.

Additionally or alternatively the instant polymer composite can be defined by its hot tack force. Thus in one specific embodiment the polymer composite has a hot tack force of at least 3.0 N, more preferably of at least 3.5 N, still more preferably of at least 4.0 N. Preferred ranges are 3.0 to 5.5 N or 3.5 to 5.0 N, like 4.0 to 4.9 N.

The melt flow rate $MFR_2$ (230° C.) for the polymer composite can be in a broad range. Accordingly in one preferred embodiment the polymer composite has a melt flow rate $MFR_2$ (230° C.) of at least 1.0 g/10 min, more preferably at least 2 g/10 min, still more preferably in the range of 1.0 to 50.0 g/10 min, yet more preferably in the range of 2 to 30.0 g/10 min, like in the range of 3 to 15.0 g/10 min.

The xylene cold soluble fraction (XCS) of the instant polymer composite is preferably not more than 55 wt.-%, more preferably not more than 45 wt.-%. Accordingly it is preferred that the polymer composite has a xylene cold soluble fraction (XCS) in the range of 5 to 55 wt.-%, more preferably in the range of 7 to 45 wt.-%.

As mentioned above the polymer composite preferably comprise three different polymers, i.e. a polypropylene (A), a propylene copolymer (B) and a low-crystalline polymer (C). in a preferred embodiment the inventive polymer composite comprises as polymer components the polypropylene (A), the propylene copolymer (B) and the low-crystalline polymer (C) only. From the wording of the three polymers it comes apparent that they are different polymers. For instance the polypropylene (A) has a lower comonomer content than the propylene copolymer (B). Further the low-crystalline polymer (C) is featured by low crystallinity whereas the polypropylene (A) and the propylene copolymer (B) are semi-crystalline polymers. One indicator whether a polymer is crystalline or rather non-crystalline is its melting temperature. Accordingly the low-crystalline polymer (C) has a lower melting temperature than the mixture (M) of the polypropylene (A) and the propylene copolymer (B), i.e. the copolymer composition (P).

Especially good results are achieved in case the individual components (A), (B), and (C) are present in specific amounts.

Accordingly it is preferred that
(ii) the weight ratio of the polypropylene (A) to the propylene copolymer (B) is in the range of 20/80 to 80/20, preferably in the range of 30/70 to 70/30, more preferably 30/70 to 50/50, and
(iii) weight ratio of the propylene copolymer composition (P) to the low-crystalline polymer (C) [(P)/(C)] is 95/5 to 50/50, more preferably 93/7 to 60/40.

In one preferred embodiment the polymer composite comprises
(a) 15 to 40 wt.-%, preferably 20 to 40 wt.-%, more preferably 25 to 35 wt.-%, of the polypropylene (A)
(b) 35 to 70 wt.-%, preferably 50 to 70 wt.-%, more preferably 55 to 65 wt.-%, of the propylene copolymer (B)
(c) 5 to 50 wt.-%, preferably 7 to 40 wt.-%, of the low-crystalline polymer (C), based on the polymer composite, preferably based on the total amount of the polypropylene (A), propylene copolymer (B), and the low-crystalline polymer (C).

The polymer composite according to this invention is preferably obtained by (melt)-mixing the propylene copolymer composition (P), i.e. the polypropylene (A) and the propylene copolymer (B), with the low-crystalline polymer (C). During the mixing suitable additives can additionally be added. For mixing, a conventional compounding or blending apparatus, e.g. a Banbury mixer, a 2-roll rubber mill, Buss-co-kneader or a twin screw extruder may be used. The polymer composite recovered from the extruder is usually in the form of pellets.

In the following the individual polymers will be described in more detail.

Propylene Copolymer Composition (P)

As mentioned above the polymer composite is preferably obtained by mixing, e.g. by melt mixing, the mixture (M) comprising the polypropylene (A) and the propylene copolymer (B), i.e. the propylene copolymer composition (P), with the low-crystalline polymer (C). Accordingly in the following more detailed information is provided for the mixture (M), i.e. the copolymer composition (P) comprising the polypropylene (A) and the propylene copolymer (B).

Preferably the propylene copolymer composition (P) comprises, preferably consists of, two fractions, namely the polypropylene (A) and the propylene copolymer (B). Further the polypropylene (A) is preferably the comonomer lean fraction whereas the propylene copolymer (B) is the comonomer rich fraction.

A "comonomer" according to this invention is a polymerizable unit, preferably a α-olefin, different to propylene.

Thus it is appreciated that the polypropylene (A) has a comonomer content of below 4.0 wt.-%, more preferably of not more than 2.5 wt.-%, yet more preferably of not more than 1.0 wt.-%. Accordingly the polypropylene (A) can be a propylene copolymer (C-A) or a propylene homopolymer (H-A), the latter being preferred.

The expression homopolymer used in the instant invention relates to a polypropylene that consists of at least 99.5 wt.-%, more preferably of at least 99.8 wt.-%, of propylene units. In a preferred embodiment only propylene units in the propylene homopolymer are detectable.

In case the polypropylene (A) is a propylene copolymer (C-A) the comonomer content is in the range of 0.2 to 4.0 wt.-%, preferably in the range of 0.2 to 2.5 wt.-%, more preferably in the range 0.5 to 1.0 wt.-%. More preferably the propylene copolymer (C-A) is a random propylene copolymer. The comonomers of the propylene copolymer (C-A) are $C_5$ to $C_{12}$ α-olefins, more preferably the comonomers of the propylene copolymer (C-A) are selected from the group of liner $C_5$ to $C_{12}$ α-olefins, still more preferably the comonomers of the propylene copolymer (C-A) are 1-hexene and/or 1-octene. The propylene copolymer (C-A) may contain more than one type of comonomer. Thus the propylene copolymer (C-A) of the present invention may contain one, two or three different comonomers. However it is preferred that the propylene copolymer (C-A) contains only one type of comonomer. Preferably the propylene copolymer (C-A) comprises—apart from propylene—only 1-hexene and/or 1-octene. In an especially preferred embodiment the comonomer of the propylene copolymer (C-A) is only 1-hexene.

Thus the propylene copolymer (C-A) is in one preferred embodiment a propylene copolymer of propylene and 1-hexene only, wherein the 1-hexene content is in the range of 0.2 to 4.0 wt.-%, preferably in the range of 0.2 to 2.5 wt.-%, more preferably in the range 0.5 to 1.0 wt. %.

The propylene copolymer (B) has preferably a higher comonomer content than the polypropylene (A). Accordingly the propylene copolymer (B) has a comonomer content of 4.0 wt.-% to 20.0 wt.-%, preferably 4.0 to 10.0 wt.-%.

More preferably the propylene copolymer (B) is a random propylene copolymer.

The comonomers of the propylene copolymer (B) are $C_5$ to $C_{12}$ α-olefins, more preferably the comonomers of the propylene copolymer (B) are selected from the group of linear $C_5$ to $C_{12}$ α-olefins, still more preferably the comonomers of the propylene copolymer (B) are 1-hexene and/or 1-octene. The propylene copolymer (B) may contain more than one type of comonomer. Thus the propylene copolymer (B) of the present invention may contain one, two or three different comonomers. However it is preferred that the propylene copolymer (B) contains only one type of comonomer. Preferably the propylene copolymer (B) comprises—apart from propylene—only 1-hexene and/or 1-octene. In an especially preferred embodiment the comonomer of the propylene copolymer (B) is only 1-hexene.

Thus the propylene copolymer (B) is in a preferred embodiment a propylene copolymer of propylene and 1-hexene only, wherein the 1-hexene content is in the range of 4.0 to 10.0 wt.-%.

It is in particular preferred that the comonomers of the propylene copolymer (C-A) and of the propylene copolymer (B) are the same. Accordingly in one preferred embodiment the propylene copolymer composition (P) of the instant invention comprises, preferably comprises only, a propylene copolymer (C-A) and a propylene copolymer (B), in both polymers the comonomer is only 1-hexene.

In an especially preferred embodiment the propylene copolymer composition (P) of the instant invention comprises, preferably comprises only, a propylene homopolymer (H-A) and a propylene copolymer (B), wherein the comonomers of the propylene copolymer (B) are selected from the group consisting of $C_5$ α-olefin, $C_6$ α-olefin, $C_7$ α-olefin, $C_8$ α-olefin, $C_9$ α-olefin, $C_{10}$ α-olefin, $C_{11}$ α-olefin, an $C_{12}$ α-olefin, preferably the comonomers of the propylene copolymer (B) are 1-hexene and/or 1-octene, more preferably the comonomer of the propylene copolymer (B) is 1-hexene only.

Keeping the information provided for the polypropylene (A) and the propylene copolymer (B) in mind, it is preferred that the propylene copolymer composition (P) according to this invention shall have a comonomer content of at least 2.5 wt.-%, more preferably of at least 2.8 wt.-%, still more preferably of at least 3.0 wt.-%. However the propylene copolymer composition (P) according to this invention shall not comprise an elastomeric component. Thus it is preferred that the propylene copolymer composition (P) according to this invention has a comonomer content in the range of 2.5 to 10 wt.-%, more preferably in the range of 2.5 to 7 wt.-%, still more preferably in the range of 2.8 to 6 wt.-%, like in the range of 3.0 to 6 wt.-%.

The comonomers of the propylene copolymer composition (P) are the same as for the polypropylene (A) and the propylene copolymer (B), respectively. Accordingly it is preferred that the comonomers of the propylene copolymer composition (P) are $C_5$ to $C_{12}$ α-olefins, e.g. 1-hexene and/or 1-octene. The propylene copolymer composition (P) of the present invention may contain more than one type of comonomer. Thus the propylene copolymer composition (P) of the present invention may contain one, two or three different comonomers, the comonomers are selected from the group of linear $C_5$ to $C_{12}$ α-olefins. However it is preferred that the propylene copolymer composition (P) contains only one type of comonomer. Preferably the propylene copolymer composition (P) comprises—apart from propylene—only 1-hexene and/or 1-octene. In an especially preferred embodiment the comonomer of the propylene copolymer composition (P) is only 1-hexene.

The propylene copolymer composition (P) as well as the propylene copolymer (C-A) and the propylene copolymer (B) according to this invention are preferably random propylene copolymers. The term "random copolymer" has to be preferably understood according to IUPAC (Pure Appl. Chem., Vol. No. 68, 8, pp. 1591 to 1595, 1996).

Preferably the molar concentration of comonomer dyads, like 1-hexene dyads, obeys the relationship $$[HH] < [H]^2$$

wherein
[HH] is the molar fraction of adjacent comonomer units, like of adjacent 1-hexene units, and
[H] is the molar fraction of total comonomer units, like of total 1-hexene units, in the polymer.

Preferably the propylene copolymer composition (P) as well as the polypropylene (A) and the propylene copolymer (B) as defined in detail below are isotactic. Accordingly it is appreciated that the propylene copolymer composition (P), the polypropylene (A) and the propylene copolymer (B) have a rather high isotactic triad concentration, i.e. higher than 90%, more preferably higher than 92%, still more preferably higher than 93% and yet more preferably higher than 95%, like higher than 99%.

The polypropylene (A) is preferably the high molecular weight fraction whereas the propylene copolymer (B) is the low molecular weight fraction.

Accordingly it is appreciated that the polypropylene (A) has a melt flow rate $MFR_2$ (230° C.) of not more than 15 g/10 min, more preferably of not more than 10 g/10 min, still more preferably of not more than 8 g/10 min, yet more preferably in the range of 1 to 15 g/10 min, like 2 to 10 g/10 min.

As a low melt flow rate indicates a high molecular weight, it is preferred that the polypropylene (A) has a weight average molecular weight ($M_w$) of at least 150 kg/mol, more preferably of at least 180 kg/mol, still more preferably of at least 200 kg/mol, yet more preferably in the range of 150 to 400 kg/mol, like in the range of 200 to 300 kg/mol.

On the other hand the propylene copolymer (B) preferably has a higher melt flow rate than the polypropylene (A). Accordingly it is preferred that the propylene copolymer (B) has a melt flow rate $MFR_2$ (230° C.) measured according to ISO 1133 of more than 4 g/10 min, more preferably of more than 8 g/10 min, still more preferably of more than 12.0 g/10 min, yet more preferably in the range of more than 4 to 200 g/10 min, like 8 to 100.0 g/10 min.

Accordingly it is appreciated that the propylene copolymer (B) has a weight average molecular weight ($M_w$) of below 250 kg/mol, still more preferably of below 220 kg/mol, yet more preferably below 200 kg/mol, like in the range of 100 to 200 kg/mol.

The overall melt flow rate, i.e. the melt flow rate $MFR_2$ (230° C.) measured according to ISO 1133 of the propylene copolymer composition (P) is preferably at least 1 g/10 min, more preferably at least 2 g/10 min, still more preferably in the range of 1.0 to 50.0 g/10 min, yet more preferably in the range of 2.0 to 30.0 g/10 min, like in the range of 3.0 to 25.0 g/10 min.

Preferably the propylene copolymer composition (P) has a weight average molecular weight ($M_w$) from 100 to 700 kg/mol, more preferably from 150 to 500 kg/mol.

The number average molecular weight ($M_n$) of the propylene copolymer composition (P) is preferably in the range of 20 to 200 kg/mol, more preferably from 30 to 150 kg/mol.

In one specific embodiment the polypropylene (A) preferably has a xylene cold soluble (XCS) content of below 2.0 wt.-%, more preferably of below 1.5 wt.-%, still more preferably in the range of 0 to 2.0 wt.-%, yet more preferably in the range of 0 to 1.5 wt.-%. It is in particular preferred that the polypropylene (A) has a lower xylene cold soluble (XCS) content compared to the propylene copolymer composition (P).

The xylene cold soluble (XCS) content of the propylene copolymer composition (P) is preferably below 15 wt.-%, more preferably of below 10 wt.-%, yet more preferably equal or below 5 wt.-%, still more preferably below 3 wt.-%, like below 2 wt.-%. Thus it is in particular appreciated that the propylene copolymer composition (P) of the instant invention has a xylene cold soluble (XCS) content in the range of 0.5 to 15 wt.-%, more preferably in the range of 0.5 to 10 wt.-%, yet more preferably in the range of 0.5 to 5 wt.-%.

A further characteristic of the propylene copolymer composition (P) is its a rather high melting point. Accordingly it is appreciated that the propylene copolymer composition (P) has a melting temperature of more than 130.0° C., more preferably of at least 135° C., still more preferably of at least 140° C., yet more preferably of at least 145° C. Thus it is in particular appreciated that the melting temperature of the propylene copolymer composition (P) is in the range of more than 130 to 165° C., more preferably in the range of 135 to 163° C., still more preferably in the range of 140 to 163° C., like in the range of 145 to 163° C.

Additionally it is appreciated that the propylene copolymer composition (P) has crystallization temperature of at least 90° C., more preferably of at least 95° C. Accordingly the propylene copolymer composition (P) has preferably a crystallization temperature in the range of 90 to 115° C., more preferably in the range of 95 to 112° C.

The propylene copolymer composition (P) is in particular obtainable, preferably obtained, in the presence of a metallocene catalyst, in particular in the presence of a metallocene catalyst as defined in detail below. Accordingly the propylene copolymer composition (P) is in particular obtainable, preferably obtained, by a sequential polymerization process comprising at least two reactors connected in series, wherein said process comprises the steps of (A) polymerizing in a first reactor (R-1) being a slurry reactor (SR), preferably a loop reactor (LR), propylene and optionally at least one $C_5$ to $C_{12}$ α-olefin, preferably 1-hexene, obtaining a polypropylene (A), (B) transferring said polypropylene (A) and unreacted comonomers of the first reactor in a second reactor (R-2) being a gas phase reactor (GPR-1), (C) feeding to said second reactor (R-2) propylene and at least one $C_4$ to $C_{10}$ α-olefin, (D) polymerizing in said second reactor (R-2) and in the presence of said polypropylene (A) propylene and at least one $C_5$ to $C_{12}$ α-olefin obtaining a propylene copolymer (B), said polypropylene (A) and said propylene copolymer (B) form the propylene copolymer composition (P), wherein further
in the first reactor (R-1) and second reactor (R-2) the polymerization takes place in the presence of a solid catalyst system (SCS), said solid catalyst system (SCS) comprises (i) a transition metal compound of formula (I)

$$R_n(Cp')_2MX_2 \quad (I)$$

wherein

"M" is zirconium (Zr) or hafnium (Hf), each "X" is independently a monovalent anionic σ-ligand, each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M), "R" is a bivalent bridging group linking said organic ligands (Cp'), "n" is 1 or 2, preferably 1, and (ii) optionally a cocatalyst (Co) comprising an element (E) of group 13 of the periodic table (IUPAC), preferably a cocatalyst (Co) comprising a compound of Al.

Concerning the definition of the propylene copolymer composition (P), the polypropylene (A) and the propylene copolymer (B) it is referred to the definitions given above.

The term "sequential polymerization process" indicates that the propylene copolymer composition (P) is produced in at least two reactors connected in series. Accordingly, a decisive aspect of the present process is the preparation of the propylene copolymer composition (P) in two different reactors. Thus the present process comprises at least a first reactor (R-1) and a second reactor (R-2). In one specific embodiment the instant process consists of two polymerization reactors (R-1) and (R-2). The term "polymerization reactor" shall indicate that the main polymerization takes place. Thus in case the process consists of two polymerization reactors, this definition does not exclude the option that the overall process comprises for instance a pre-polymerization step in a pre-polymerization reactor. The term "consists of" is only a closing formulation in view of the main polymerization reactors.

The first reactor (R-1) is preferably a slurry reactor (SR) and can be can be any continuous or simple stirred batch tank reactor or loop reactor operating in bulk or slurry. Bulk means a polymerization in a reaction medium that comprises of at least 60% (wt/wt), preferably 100% monomer. According to the present invention the slurry reactor (SR) is preferably a (bulk) loop reactor (LR).

The second reactor (R-2) and any subsequent reactor are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

The condition (temperature, pressure, reaction time, monomer feed) in each reactor is dependent on the desired product which is in the knowledge of a person skilled in the art. As already indicated above, the first reactor (R-1) is preferably a slurry reactor (SR), like a loop reactor (LR), whereas the second reactor (R-2) is preferably a gas phase reactor (GPR-1). The subsequent reactors—if present—are also preferably gas phase reactors (GPR).

A preferred multistage process is a "loop-gas phase"-process, such as developed by Borealis A/S, Denmark (known as BORSTAR® technology) described e.g. in patent literature, such as in EP 0 887 379 or in WO 92/12182.

Multimodal polymers can be produced according to several processes which are described, e.g. in WO 92/12182, EP 0 887 379, and WO 98/58976. The contents of these documents are included herein by reference.

Preferably, in the instant process for producing propylene copolymer composition (P) as defined above the conditions for the first reactor (R-1), i.e. the slurry reactor (SR), like a loop reactor (LR), of step (A) may be as follows:

the temperature is within the range of 40° C. to 110° C., preferably between 60° C. and 100° C., 70 to 90° C., the pressure is within the range of 20 bar to 80 bar, preferably between 40 bar to 70 bar, hydrogen can be added for controlling the molar mass in a manner known per se.

Subsequently, the reaction mixture from step (A) is transferred to the second reactor (R-2), i.e. gas phase reactor (GPR-1), i.e. to step (C), whereby the conditions in step (C) are preferably as follows:

the temperature is within the range of 50° C. to 130° C., preferably between 60° C. and 100° C., the pressure is within the range of 5 bar to 50 bar, preferably between 15 bar to 40 bar, hydrogen can be added for controlling the molar mass in a manner known per se.

The residence time can vary in both reactor zones.

In one embodiment of the process for producing propylene copolymer composition (P) the residence time in bulk reactor, e.g. loop is in the range 0.1 to 2.5 hours, e.g. 0.2 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R-1), i.e. in the slurry reactor (SR), like in the loop reactor (LR), and/or as a condensed mode in the gas phase reactor (GPR-1).

The conditions in the other gas phase reactors (GPR), if present, are similar to the second reactor (R-2).

The present process may also encompass a pre-polymerization prior to the polymerization in the first reactor (R-1). The pre-polymerization can be conducted in the first reactor (R-1), however it is preferred that the pre-polymerization takes place in a separate reactor, so called pre-polymerization reactor.

In one specific embodiment the solid catalyst system (SCS) has a porosity measured according ASTM 4641 of less than 1.40 ml/g and/or a surface area measured according to ASTM D 3663 of lower than 25 m²/g.

Preferably the solid catalyst system (SCS) has a surface area of lower than 15 m²/g, yet still lower than 10 m²/g and most preferred lower than 5 m²/g, which is the lowest measurement limit. The surface area according to this invention is measured according to ASTM D 3663 (N₂).

Alternatively or additionally it is appreciated that the solid catalyst system (SCS) has a porosity of less than 1.30 ml/g and more preferably less than 1.00 ml/g. The porosity has been measured according to ASTM 4641 (N₂). In another preferred embodiment the porosity is not detectable when determined with the method applied according to ASTM 4641 (N₂).

Furthermore the solid catalyst system (SCS) typically has a mean particle size of not more than 500 μm, i.e. preferably in the range of 2 to 500 μm, more preferably 5 to 200 μm. It is in particular preferred that the mean particle size is below 80 μm, still more preferably below 70 μm. A preferred range for the mean particle size is 5 to 70 μm, or even 10 to 60 μm.

As stated above the transition metal (M) is zirconium (Zr) or hafnium (Hf), preferably zirconium (Zr).

The term "σ-ligand" is understood in the whole description in a known manner, i.e. a group bound to the metal via a sigma bond. Thus the anionic ligands "X" can independently be halogen or be selected from the group consisting of R', OR', SiR'₃, OSiR'₃, OSO₂CF₃, OCOR', SR', NR'₂ or PR'₂ group wherein R' is independently hydrogen, a linear or branched, cyclic or acyclic, $C_1$ to $C_{20}$ alkyl, $C_2$ to $C_{20}$ alkenyl, $C_2$ to $C_{20}$ alkynyl, $C_3$ to $C_{12}$ cycloalkyl, $C_6$ to $C_{20}$ aryl, $C_7$ to $C_{20}$ arylalkyl, $C_7$ to $C_{20}$ alkylaryl, $C_8$ to $C_{20}$ arylalkenyl, in which the R' group can optionally contain one or more heteroatoms belonging to groups 14 to 16. In a preferred embodiments the anionic ligands "X" are identical and either halogen, like Cl, or methyl or benzyl.

A preferred monovalent anionic ligand is halogen, in particular chlorine (Cl).

The substituted cyclopentadienyl-type ligand(s) may have one or more substituent(s) being selected from the group consisting of halogen, hydrocarbyl (e.g. $C_1$ to $C_{20}$ alkyl, $C_2$ to $C_{20}$ alkenyl, $C_2$ to $C_{20}$ alkynyl, $C_3$ to $C_{20}$ cycloalkyl, like $C_1$ to $C_{20}$ alkyl substituted $C_5$ to $C_{20}$ cycloalkyl, $C_6$ to $C_{20}$ aryl, $C_5$ to $C_{20}$ cycloalkyl substituted $C_1$ to $C_{20}$ alkyl wherein the cycloalkyl residue is substituted by $C_1$ to $C_{20}$ alkyl, $C_7$ to $C_{20}$ arylalkyl, $C_3$ to $C_{12}$ cycloalkyl which contains 1, 2, 3 or 4 heteroatom(s) in the ring moiety, $C_6$ to $C_{20}$-heteroaryl, $C_1$ to $C_{20}$-haloalkyl, —SiR"$_3$, —SR", —PR"$_2$ or —NR"$_2$, each R" is independently a hydrogen or hydrocarbyl (e.g. $C_1$ to $C_{20}$ alkyl, $C_1$ to $C_{20}$ alkenyl, $C_2$ to $C_{20}$ alkynyl, $C_3$ to $C_{12}$ cycloalkyl, or $C_6$ to $C_{20}$ aryl) or e.g. in case of —NR"$_2$, the two substituents R" can form a ring, e.g. five- or six-membered ring, together with the nitrogen atom wherein they are attached to.

Further "R" of formula (I) is preferably a bridge of 1 to 4 atoms, such atoms being independently carbon (C), silicon (Si), germanium (Ge) or oxygen (O) atom(s), whereby each of the bridge atoms may bear independently substituents, such as $C_1$ to $C_{20}$-hydrocarbyl, tri($C_1$ to $C_{20}$-alkyl)silyl, tri($C_1$ to $C_{20}$-alkyl)siloxy and more preferably "R" is a one atom bridge like e.g. —SiR'''$_2$—, wherein each R''' is independently $C_1$ to $C_{20}$-alkyl, $C_2$ to $C_{20}$-alkenyl, $C_2$ to $C_{20}$-alkynyl, $C_3$ to $C_{12}$ cycloalkyl, $C_6$ to $C_{20}$-aryl, alkylaryl or arylalkyl, or tri($C_1$ to $C_{20}$ alkyl)silyl- residue, such as trimethylsilyl-, or the two R''' can be part of a ring system including the Si bridging atom.

In a preferred embodiment the transition metal compound has the formula (II)

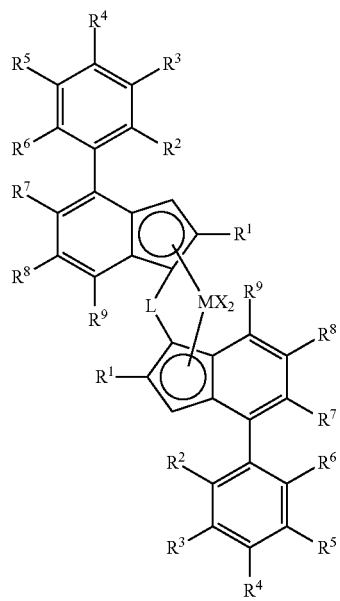

wherein

M is zirconium (Zr) or hafnium (Hf), preferably zirconium (Zr),

X are ligands with a σ-bond to the metal "M", preferably those as defined above for formula (I),
preferably chlorine (Cl) or methyl ($CH_3$), the former especially preferred, $R^1$ are equal to or different from each other, preferably equal to, and are selected from the group consisting of linear saturated $C_1$ to $C_{20}$ alkyl, linear unsaturated $C_1$ to $C_{20}$ alkyl, branched saturated $C_1$-$C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), preferably are equal to or different from each other, preferably equal to, and are $C_1$ to $C_{10}$ linear or branched hydrocarbyl, more preferably are equal to or different from each other, preferably equal to, and are $C_1$ to $C_6$ linear or branched alkyl, $R^2$ to $R^6$ are equal to or different from each other and are selected from the group consisting of hydrogen, linear saturated $C_1$-$C_{20}$ alkyl, linear unsaturated $C_1$-$C_{20}$ alkyl, branched saturated $C_1$-$C_{20}$ alkyl, branched unsaturated $C_1$-$C_{20}$ alkyl, $C_3$-$C_{20}$ cycloalkyl, $C_6$-$C_{20}$ aryl, $C_7$-$C_{20}$ alkylaryl, and $C_7$-$C_{20}$ arylalkyl, optionally containing one or more heteroatoms of groups 14 to 16 of the Periodic Table (IUPAC), preferably are equal to or different from each other and are $C_1$ to $C_{10}$ linear or branched hydrocarbyl, more preferably are equal to or different from each other and are $C_1$ to $C_6$ linear or branched alkyl, $R^7$ and $R^8$ are equal to or different from each other and selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, optionally containing one or more heteroatoms of groups 14 to 16 of the Periodic Table (IUPAC), $SiR^{10}_3$, $GeR^{10}_3$, $OR^{10}$, $SR^{10}$ and $NR^{10}_2$, wherein $R^{10}$ is selected from the group consisting of linear saturated $C_1$-$C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC),
and/or $R^7$ and $R^8$ being optionally part of a $C_4$ to $C_{20}$ carbon ring system together with the indenyl carbons to which they are attached, preferably a $C_5$ ring, optionally one carbon atom can be substituted by a nitrogen, sulfur or oxygen atom, $R^9$ are equal to or different from each other and are selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, $OR^{10}$, and $SR^{10}$, preferably $R^9$ are equal to or different from each other and are H or $CH_3$, wherein $R^{10}$ is defined as before, L is a bivalent group bridging the two indenyl ligands, preferably being a $C_2R^{11}_4$ unit or a $SiR^{11}_2$ or $GeR^{11}_2$, wherein, $R^{11}$ is selected from the group consisting of H, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl or $C_7$ to $C_{20}$ arylalkyl, optionally containing one or more heteroatoms of groups 14 to 16 of the Periodic Table (IUPAC), preferably $Si(CH_3)_2$, $SiCH_3C_6H_{11}$, or $SiPh_2$, wherein $C_6H_{11}$ is cyclohexyl.

Preferably the transition metal compound of formula (II) is $C_2$-symmetric or pseudo-$C_2$-symmetric. Concerning the definition of symmetry it is referred to Resconi et al. Chemical Reviews, 2000, Vol. 100, No. 4 1263 and references herein cited.

Preferably the residues $R^1$ are equal to or different from each other, more preferably equal, and are selected from the group consisting of linear saturated $C_1$ to $C_{10}$ alkyl, linear unsaturated $C_1$ to $C_{10}$ alkyl, branched saturated $C_1$ to $C_{10}$ alkyl, branched unsaturated $C_1$ to $C_{10}$ alkyl and $C_7$ to $C_{12}$ arylalkyl. Even more preferably the residues $R^1$ are equal to or different from each other, more preferably equal, and are selected from the group consisting of linear saturated $C_1$ to $C_6$ alkyl, linear unsaturated $C_1$ to $C_6$ alkyl, branched saturated $C_1$ to $C_6$ alkyl, branched unsaturated $C_1$ to $C_6$ alkyl and $C_7$ to $C_{10}$ arylalkyl. Yet more preferably the residues $R^1$ are equal to or different from each other, more preferably equal, and are selected from the group consisting of linear or branched $C_1$ to $C_4$ hydrocarbyl, such as for example methyl or ethyl.

Preferably the residues $R^2$ to $R^6$ are equal to or different from each other and linear saturated $C_1$ to $C_4$ alkyl or branched saturated $C_1$ to $C_4$ alkyl. Even more preferably the residues $R^2$ to $R^6$ are equal to or different from each other, more preferably equal, and are selected from the group consisting of methyl, ethyl, iso-propyl and tert-butyl.

Preferably $R^7$ and $R^8$ are equal to or different from each other and are selected from hydrogen and methyl, or they are part of a 5-methylene ring including the two indenyl ring carbons to which they are attached. In another preferred embodiment, $R^7$ is selected from $OCH_3$ and $OC_2H_5$, and $R^8$ is tert-butyl.

In a preferred embodiment the transition metal compound is rac-methyl(cyclohexyl)silanediyl bis(2-methyl-4-(4-tert-butylphenyl)indenyl)zirconium dichloride.

In a second preferred embodiment, the transition metal compound is rac-dimethylsilanediyl bis(2-methyl-4-phenyl-1,5,6,7-tetrahydro-s-indacen-1-yl)zirconium dichloride.

In a third preferred embodiment, the transition metal compound is rac-dimethylsilanediyl bis(2-methyl-4-phenyl-5-methoxy-6-tert-butylindenyl)zirconium dichloride.

A a further requirement the solid catalyst system (SCS) according to this invention must comprise a cocatalyst (Co) comprising an element (E) of group 13 of the periodic table (IUPAC), for instance the cocatalyst (Co) comprises a compound of Al.

Examples of such cocatalyst (Co) are organo aluminium compounds, such as aluminoxane compounds.

Such compounds of Al, preferably aluminoxanes, can be used as the only compound in the cocatalyst (Co) or together with other cocatalyst compound(s). Thus besides or in addition to the compounds of Al, i.e. the aluminoxanes, other cation complex forming cocatalyst compounds, like boron compounds can be used. Said cocatalysts are commercially available or can be prepared according to the prior art literature. Preferably however in the manufacture of the solid catalyst system only compounds of Al as cocatalyst (Co) are employed.

In particular preferred cocatalysts (Co) are the aluminoxanes, in particular the C1 to C10-alkylaluminoxanes, most particularly methylaluminoxane (MAO).

Preferably, the organo-zirconium compound of formula (I) and the cocatalyst (Co) of the solid catalyst system (SCS) represent at least 70 wt %, more preferably at least 80 wt %, even more preferably at least 90 wt %, even further preferably at least 95 wt % of the solid catalyst system. Thus it is appreciated that the solid catalyst system is featured by the fact that it is self-supported, i.e. it does not comprise any catalytically inert support material, like for instance silica, alumina or $MgCl_2$ or porous polymeric material, which is otherwise commonly used in heterogeneous catalyst systems, i.e. the catalyst is not supported on external support or carrier material. As a consequence of that the solid catalyst system (SCS) is self-supported and it has a rather low surface area.

In one embodiment the solid metallocene catalyst system (SCS) is obtained by the emulsion solidification technology, the basic principles of which are described in WO 03/051934. This document is herewith included in its entirety by reference.

Hence the solid catalyst system (SCS) is preferably in the form of solid catalyst particles, obtainable by a process comprising the steps of a) preparing a solution of one or more catalyst components;

b) dispersing said solution in a second solvent to form an emulsion in which said one or more catalyst components are present in the droplets of the dispersed phase, c) solidifying said dispersed phase to convert said droplets to solid particles and optionally recovering said particles to obtain said catalyst.

Preferably a first solvent, more preferably a first organic solvent, is used to form said solution. Still more preferably the organic solvent is selected from the group consisting of a linear alkane, cyclic alkane, aromatic hydrocarbon and halogen-containing hydrocarbon.

Moreover the second solvent forming the continuous phase is an inert solvent towards to catalyst components, The second solvent might be immiscible towards the solution of the catalyst components at least under the conditions (like temperature) during the dirpersing step. The term "immiscible with the catalyst solution" means that the second solvent (continuous phase) is fully immiscible or partly immiscible i.e. not fully miscible with the dispersed phase solution.

Preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or perfluoro (1,3-dimethylcyclohexane or a mixture thereof.

Furthermore it is preferred that the emulsion comprising said continuous phase and said dispersed phase is a bi- or multiphasic system as known in the art. An emulsifier may be used for forming and stabilising the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated C1-n (suitably C4-30- or C5-15) alcohol (e.g. highly fluorinated heptanol, octanol or nonanol), oxide (e.g. propenoxide) or acrylate ester which reacts e.g. with a cocatalyst component, such as aluminoxane to form the "actual" surfactant.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

For further details, embodiments and examples of the continuous and dispersed phase system, emulsion formation method, emulsifying agent and solidification methods reference is made e.g. to the above cited international patent application WO 03/051934.

All or part of the preparation steps can be done in a continuous manner. Reference is made to WO 2006/069733 describing principles of such a continuous or semicontinuous preparation methods of the solid catalyst types, prepared via emulsion/solidification method.

The above described catalyst components are prepared according to the methods described in WO 01/48034.

The Low-crystalline Polymer (C)

Different to the polypropylene (A) and the propylene copolymer (B) the low-crystalline polymer (C) is featured by rather low crystallinity. Low crystalline polymers (C) have a rather low melting temperature. Accordingly the low-crystalline polymer (C) according to this invention has a melting temperature of below 120° C., preferably below 110° C., more preferably below 100° C., still more preferably in the range of 25 to below 120° C., yet more preferably in the range of 35 to 110° C., still yet more preferably in the range 50 to 100° C.

Further, the low crystalline polymers (C) preferably has a crystallinity as measured by its melting enthalpy (by DSC) of not more than 40%, more preferably in the range of 5 to 40, yet more preferably in the range of 5 to 35%, still more preferably in the range of 5 to 30%, still yet more preferably in the range of 5 to 25%.

In one preferred embodiment the low crystalline polymers (C) have a low heat of fusion ($H_f$) Thus it is preferred that the low crystalline polymers (C) has a low heat of fusion ($H_f$) of not more than 60 J/g, more preferably of not more than 50 J/g, still more preferably in the range of 5 to 60 J/g, yet more preferably in the range of 5 to 50 J/g, still yet more preferably in the range of 10 to 50 J/g.

Furthermore, the low crystalline polymers (C) has preferably a density of below 920 kg/m$^3$, more preferably of below 910 kg/m$^3$, still more preferably in the range of 800 to 920 kg/m$^3$, yet more preferably in the range of 850 to 910 kg/m$^3$ and most preferably in the range of 850 to 890 kg/m$^3$.

In a preferred embodiment, the low crystalline polymer (C) has a melt flow rate $MFR_2$ (230° C.) in the range of 0.5 to 50 g/10 min. More preferably, the low crystalline polymers (C) has a melt flow rate $MFR_2$ (230° C.) in the range of 1 to 40 g/10 min, more preferably in the range of 1 to 30 g/10 min, yet more.

The low crystalline polymer (C) can be any polyolefin, like a polypropylene or a polybutene or a very low density polyethylene (VLDPE). Preferably the low crystalline polymer (C) is a polypropylene, i.e. a propylene copolymer, like a propylene copolymer with ethylene and/or $C_4$ to $C_{12}$ α-olefins. Accordingly in one preferred embodiment the low crystalline polymer (C) is a propylene copolymer comprising propylene monomer units and comonomer units selected from ethylene, 1-butene, 1-pentene, 1-hexene, 1-heptene and 1-octene, preferably the comonomer is selected from 1-octene and ethylene, the latter especially preferred. Preferably the comonomer content, e.g. ethylene content, is 6 to equal or below 25 wt.-%, more preferably 7 to 20 wt.-%, like 7.0 to 17.0 wt.-%.

Preferably the low crystalline polymers (C) according to this invention have been produced in the presence of a metallocene catalyst.

Low crystalline polymers (C) according to this invention are known in the art. Typical commercial products are the Vistamaxx polypropylene grades of Exxon Mobil, Versify polypropylene grades of Dow, Tafiner polypropylene and VLDPE grades of Mitsui, as well as the TafmerBL polybutene grades of Mitsui and Koattro polybutene grades of Basell. In one preferred embodiment the low crystalline polymer (C) is a Vistamaxx grade of Exxon Mobil.

Additives

The polymer composite may contain additives known in the art, like antioxidants, nucleating agents, slip agents and antistatic agents. Typically the composite may contain not more than 7 wt.-%, yet more preferably not more than 5 wt.-%, like not more than 2.5 wt.-% of additives mentioned herein.

Articles

More over the present invention is related to the manufacture of the extrusion coated substrates by conventional extrusion coating of the polymer composite as defined herein.

The film according to this invention can be obtained in a conventional manner for instance by cast film technology or extrusion blown film technology. In case the film shall be stretched, i.e. a biaxially oriented polypropylene film, it is produced preferably as follows: first, a cast film is prepared by extrusion of the polymer composite in the form of pellets. The prepared cast films may typically have a thickness of 50 to 100 μm as used for further film stretching. Subsequently, a stack of cast films can be prepared from a number of cast film sheets to achieve a specific stack thickness, e.g. 700 to 1000 μM. The stretching temperature is typically set to a temperature slightly below the melting point, e.g. 2 to 4° C. below the Melting point, and the film is stretched at a specific draw ratio in machine direction and transverse direction.

The extrusion coating process may be carried out using conventional extrusion coating techniques. Hence, the polymer composite obtained from the above defined polymerization process is fed, typically in the form of pellets, optionally containing additives, to an extruding device. From the extruder the polymer melt is passed preferably through a flat die to the substrate to be coated. Due to the distance between the die lip and the nip, the molten plastic is oxidized in the air for a short period, usually leading to an improved adhesion between the coating and the substrate. The coated substrate is cooled on a chill roll, after which it is passed to edge trimmers and wound up. The width of the line may vary between, for example, 500 to 1500 mm, e.g. 800 to 1100 mm, with a line speed of up to 1000 m/min, for instance 300 to 800 m/min. The temperature of the polymer melt is typically between 275 and 330° C. The polymer composite of the invention can be extruded onto the substrate as a monolayer coating or as one layer in coextrusion. In either of these cases it is possible to use the polymer composite as such or to blend the polymer composite with other polymers. Blending can occur in a post reactor treatment or just prior to the extrusion in the coating process. However it is preferred that only the polymer composite as defined in the present invention is extrusion coated. In a multilayer extrusion coating, the other layers may comprise any polymer resin having the desired properties and processability. Examples of such polymers include: barrier layer PA (polyamide) and ethylene-vinyl acetate (EVA); polar copolymers of ethylene, such as copolymers of ethylene and vinyl alcohol (EVOH) or copolymers of ethylene and an acrylate monomer; adhesive layers, e.g. ionomers, copolymers of ethylene and ethyl acrylate, etc; HDPE for stiffness; LDPE resins produced in a high-pressure process; LLDPE resins produced by polymerising ethylene and alpha-olefin comonomers in the presence of a Ziegler, chromium or metallocene catalyst; and MDPE resins.

Thus the present invention is preferably related to extrusion coated substrates comprising a substrate and at least one layer of the polymer composite extrusion coated on said substrate as defined in this invention.

Furthermore the present invention is also directed to the use of the inventive article as packing material, in particular as a packing material for food and/or medical products.

In the following, the present invention is described by way of examples.

EXAMPLES

A. Measuring Methods

The following definitions of terms and determination methods apply for the above general description of the invention as well as to the below examples unless otherwise defined.

Calculation of Comonomer Content of the Propylene Copolymer (B):

$$\frac{C(P) - w(A) \times C(A)}{w(B)} = C(B)$$

wherein w(A) is the weight fraction [in wt.-%] of the polypropylene (A), w(B) is the weight fraction [in wt.-%] of the propylene copolymer (B), C(A) is the comonomer content [in wt.-%] of the polypropylene (A), C(P) is the comonomer content [in wt.-%] of the propylene copolymer composition (P), C(B) is the calculated comonomer content [in wt.-%] of the propylene copolymer (B).

Calculation of the Xylene Cold Soluble (XCS) Content of the Propylene Copolymer (B):

$$\frac{XS(P) - w(A) \times XS(A)}{w(B)} = XS(A)$$

wherein w(A) is the weight fraction [in wt.-%] of the polypropylene (A), w(PP2) is the weight fraction [in wt.-%] of the propylene copolymer (B), XS(A) is the xylene cold soluble (XCS) content [in wt.-%] of the propylene copolymer (A), XS(P) is the xylene cold soluble (XCS) content [in wt.-%] of the propylene copolymer composition (P), XS(B) is the calculated xylene cold soluble (XCS) content [in wt.-%] of propylene copolymer (B).

Calculation of Melt Flow Rate $MFR_2$ (230° C.) of the Propylene Copolymer (B):

$$MFR(B) = 10^{\left[\frac{\log(MFR(P)) - w(A) \times \log(MFR(A))}{w(B)}\right]}$$

wherein w(A) is the weight fraction [in wt-%] of the polypropylene (A), w(B) is the weight fraction [in wt-%] of the propylene copolymer (B), MFR(A) is the melt flow rate $MFR_2$ (230° C.) [in g/10 min] measured according ISO 1133 of the polypropylene (A), MFR(P) is the melt flow rate $MFR_2$ (230° C.) [in g/10 min] measured according ISO 1133 of the propylene copolymer composition (P), MFR(B) is the calculated melt flow rate $MFR_2$ (230° C.) [in g/10 min] of the propylene copolymer (B).

Quantification of Microstructure by NMR Spectroscopy

Quantitative nuclear-magnetic resonance (NMR) spectroscopy was used to quantify the isotacticity, regio-regularity and comonomer content of the polymers.

Quantitative $^{13}C\{^{1}H\}$ NMR spectra recorded in the molten-state using a Bruker Advance III 500 NMR spectrometer operating at 500.13 and 125.76 MHz for $^{1}H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. Standard single-pulse excitation was employed utilising the NOE at short recycle delays (as described in Pollard, M., Klimke, K., Graf, R., Spiess, H. W., Wilhelm, M., Sperber, O., Piel, C., Kaminsky, W., Macromolecules 2004,37,813, and in Klimke, K., Parkinson, M., Piel, C., Kaminsky, W., Spiess, H. W., Wilhelm, M., Macromol. Chem. Phys. 2006,207,382) and the RS-HEPT decoupling scheme (as described in Filip, X., Tripon, C., Filip, C., J. Mag. Resn. 2005,176,239, and in Griffin, J. M., Tripon, C., Samoson, A., Filip, C., and Brown, S. P., Mag. Res. in Chem. 2007,45,S1,S198). A total of 1024 (1 k) transients were acquired per spectra.

Quantitative $^{13}C\{^{1}H\}$ NMR spectra were processed, integrated and relevant quantitative properties determined from the integrals. All chemical shifts are internally referenced to the methyl isotactic pentad (mmmm) at 21.85 ppm. The tacticity distribution was quantified through integration of the methyl region in the $^{13}C\{^{1}H\}$ spectra, correcting for any signal not related to the primary (1,2) inserted propene stereo sequences, as described in Busico, V., Cipullo, R., Prog. Polym. Sci. 2001,26,443 and in Busico, V., Cipullo, R., Monaco, G., Vacatello, M., Segre, A. L., Macromolecules 1997,30,6251.

Characteristic signals corresponding to regio defects were observed (Resconi, L., Cavallo, L., Fait, A., Piemontesi, F., Chem. Rev. 2000,100,1253). The influence of regio defects on the quantification of the tacticity distribution was corrected for by subtraction of representative regio defect integrals from specific integrals of the stereo sequences. The isotacticity was determined at the triad level and reported as the percentage of isotactic triad mm with respect to all triad sequences:

% mm=(mm/(mm+mr+rr))*100

Characteristic signals corresponding to the incorporation of 1-hexene were observed, and the 1-hexene content was calculated as the mole percent of 1-hexene in the polymer, H (mol %), according to:

[H]=$H_{tot}$/($P_{tot}$+$H_{tot}$)

where:

$H_{tot}$=I($\alpha B_4$)/2+I($\alpha\alpha B_4$)×2 where I($\alpha B_4$) is the integral of the $\alpha B_4$ sites at 44.1 ppm, which identifies the isolated 1-hexene incorporated in PPHPP sequences, and I($\alpha\alpha B_4$) is the integral of the $\alpha\alpha B_4$ sites at 41.6 ppm, which identifies the consecutively incorporated 1-hexene in PPHHPP sequences.
$P_{tot}$=Integral of all CH3 areas on the methyl region with correction applied for underestimation of other propene units not accounted for in this region and overestimation due to other sites found in this region.
and H (mol %)=100×[H]
which is then converted into wt % using the correlation H(wt %)=(100×Hmol %×84.16)/(Hmol %×84.16+ (100−Hmol %)×42.08)

A statistical distribution is suggested from the relationship between the content of hexene present in isolated (PPHPP) and consecutive (PPHHPP) incorporated comonomer sequences:

[HH]<[H]$^2$

The comonomer content of the low-crystalline polymer (C) was determined according ASTM D 3900
The content of xylene cold solubles (XCS, wt.-%) was determined at 25° C. according ISO 16152; first edition; Jul. 1, 2005.
Mw, Mn,
Mw/Mn are measured by Gel Permeation Chromatography (GPC) according to the following method:
The weight average molecular weight (Mw), the number average molecular weight (Mn), and the molecular weight distribution (MWD=Mw/Mn) is measured by a method based on ISO 16014-1:2003 and ISO 16014-4:2003. A Waters Alliance GPCV 2000 instrument, equipped with refractive index detector and online viscosimeter is used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution are injected per analysis. The column set is calibrated using relative calibration with 19 narrow MWD polystyrene (PS) standards in the range of 0.5 kg/mol to 11 500 kg/mol and a set of well characterized broad polypropylene standards. All samples are prepared by dissolving 5 to 10 mg of polymer in 10 mL (at 160° C.) of stabilized TCB (same as mobile phase) and keeping for 3 hours with continuous shaking prior sampling in into the GPC instrument.
Density is measured according to ISO 1183-1-method A (2004). Sample preparation is done by compression moulding in accordance with ISO 1872-2:2007.
MFR$_2$ (230° C.) was measured according to ISO 1133 (230° C., 2.16 kg load).

Melting temperature Tm, crystallization temperature Tcr, and the degree of crystallinity: measured with Mettler TA820 differential scanning calorimetry (DSC) on 3±0.5 mg samples. Both crystallization and melting curves were obtained during 10° C./min cooling and heating scans between 30° C. and 225° C. Melting and crystallization temperatures were taken as the peaks of endotherms and exotherms. The degree of crystallinity was calculated by comparison with heat of fusion of a perfectly crystalline polypropylene, i.e. 209 J/g (ISO 11357-3).
Haze was determined according to ASTM D 1003-07 on 60×60×2 mm$^3$ plaques injection moulded in line with EN ISO 1873-2 using a melt temperature of 200° C.
Transparency and clarity were determined according to ASTM D1003-00 on 60×60×2 mm$^3$ plaques injection moulded in line with EN ISO 1873-2 using a melt temperature of 200° C.
Sealing Initiation Temperature (SIT):
The method determines the sealing temperature range (sealing range) of polymer films. The sealing temperature range is the temperature range, in which the films can be sealed according to conditions given below.
The lower limit (heat sealing initiation temperature (SIT)) is the sealing temperature at which a sealing strength of >1 N is achieved. The upper limit (sealing end temperature (SET)) is reached, when the films stick to the sealing device.
The sealing range is determined on a DTC Hot tack tester Model 52-F/201 with a film of 25 µm thickness with the following further parameters:
Specimen width: 25 mm
Seal Pressure: 0.66 N/mm$^2$
Seal Time: 1 sec
Cool time: 30 sec
Peel Speed: 42 mm/sec
Start temperature: 80° C.
End temperature: 150° C.
Specimen is sealed sealing layer (SL) to sealing layer (SL) at each sealbar temperature and seal strength (force) is determined at each step. All values of the SIT and SET were measured on the multi-layer film, like the three layer film as used in the examples. In cases where the SIT and SET refer to the propylene copolymer composition (P) or the sealing layer (SL) as such the SIT and SET were measured on a monolayer cast film of the propylene copolymer composition (P) and the sealing layer (SL), respectively, having a thickness of 100 µm as described in application No. 10 160 631.7. and application No. 10 160 611.9.
Hot Tack Force:
The hot tack force is determined on a DTC Hot tack tester Model 52-F/201 with a film of 25 µm thickness with the following further parameters:
Specimen width: 25 mm
Seal Pressure: 1.2 N/mm$^2$
Seal Time: 0.5 sec
Cool time: 0.2 sec
Peel Speed: 200 mm/sec
Start temperature: 90° C.
End temperature: 140° C.
The maximum hot tack force, i.e the maximum of a force/temperature diagram is determined and reported.

B. Examples

The propylene copolymer compositions (P) and the propylene homopolymer of table 1 have been produced in a Borstar PP pilot plant in a two-step polymerization process starting in a bulk-phase loop reactor followed by polymerization in a gas phase reactor, varying the molecular weight as well as hexene content by appropriate hydrogen and comonomer feeds. The catalyst used in the polymerization process was a metallocene catalyst as described in example 10 of WO 2010/052263A1.

TABLE 1

Preparation of the examples

| | | H-PP | R-PP |
|---|---|---|---|
| Loop | | | |
| Temperature | [° C.] | 75 | 70 |
| $MFR_2$ | [g/10 min] | 2.2 | 4.4 |
| C6 | [wt.-%] | 0.0 | 0.0 |
| XCS | [wt.-%] | 0.6 | 0.7 |
| GPR | | | |
| Temperature | [° C.] | 85 | 85 |
| $MFR_2$ | [g/10 min] | 13.7 | 15.5 |
| C6 | [wt.-%] | 0.0 | 5.8 |
| XCS | [wt.-%] | 1.4 | 1.8 |
| Split Loop/GPR | [%] | 40/60 | 34/66 |
| FINAL | | | |
| C6 | [wt.-%] | 0.0 | 3.8 |
| XCS | [wt.-%] | 1.1 | 1.4 |
| $MFR_2$ | [g/10 min] | 6.6 | 10.0 |
| Mw | [kg/mol] | 220 | 211 |
| Tm | [° C.] | 151.5 | 149 |
| Tc | [° C.] | 109 | 101 |

R-PP is the propylene copolymer compositions (P)
H-PP is a propylene homopolymer
Loop defines the polypropylene (A)
GPR defines the propylene copolymer (B)
Final defines the propylene copolymer (P)
C6 is 1-hexene content

TABLE 2

Polymer composite

| | | CE 1 | CE 2 | E 1 | IE 2 | IE 3 | IE 4 |
|---|---|---|---|---|---|---|---|
| H-PP | [wt.-%] | — | 85 | — | — | — | — |
| R-PP | [wt.-%] | 100 | — | 92.5 | 85 | 92.5 | 85 |
| V-1 | [wt.-%] | — | — | 7.5 | 15 | — | — |
| V-2 | [wt.-%] | — | 15 | — | — | 7.5 | 15 |

V-1 is the commercial ethylene propylene copolymer VISTAMAXX 3980FL of Exxon Mobil with an $MFR_2$ (230° C.) of 8.3 g/10 min, a melting temperature of 79° C., a heat of fusion of 39.0 J/g, and an ethylene content of 8.5 wt.-%
V-2 is the commercial ethylene propylene copolymer VISTAMAXX 6102 of Exxon Mobil with an $MFR_2$ (230° C.) of 3.0 g/10 min, an ethylene content of 16.0 wt.-%

TABLE 3

Properties of the polymer composite

| | | CE 1 | CE 2 | CE 3 | IE 1 | IE 2 | IE 3 | IE 4 |
|---|---|---|---|---|---|---|---|---|
| $MFR_2$ | [g/10 min] | 10.0 | 6.5 | 6.0 | 9.9 | 9.7 | 9.0 | 8.7 |
| XCS | [wt.-%] | 1.4 | 14.2 | 4.0 | 11.1 | 16.0 | 8.4 | 13.8 |
| Tm | [° C.] | 149 | 149 | 131 | 148 | 148 | 148 | 148 |
| Tc | [° C.] | 101.2 | 111.7 | 89.5 | 99.7 | 98.3 | 100.6 | 100.1 |
| SIT | [° C.] | 109 | 122 | 106 | 106 | 104 | 105 | 104 |
| Tm − SIT | [° C.] | 40 | 27 | 25 | 42 | 44 | 43 | 44 |
| HTF | [N] | 3.8 | 2.6 | 2.2 | 4.4 | 4.5 | 4.1 | 3.6 |
| T | [%] | 90 | 67 | 90 | 90 | 90 | 81 | 73 |

TABLE 3-continued

Properties of the polymer composite

| | | CE 1 | CE 2 | CE 3 | IE 1 | IE 2 | IE 3 | IE 4 |
|---|---|---|---|---|---|---|---|---|
| H | [%] | 84 | 94 | 74 | 80 | 78 | 87 | 96 |
| C | [%] | 79 | 47 | 36 | 85 | 88 | 84 | 75 |

CE3 is the commercial ethylene-butene propylene copolymer TD215BF of Borealis AG
Tm is the melting temperature
Tc is the crystallization temperature
SIT is the heat sealing initiation temperature
Tm − SIT is the difference of Tm and SIT
HTF is the hot tack force
T is the transparency
H is the haze
C is the clarity

The invention claimed is:

1. Polymer composite comprising:
(a) a polypropylene (A) having a comonomer content of below 4.0 wt. %, the comonomers are $C_5$ to $C_{12}$ α-olefins,
(b) a propylene copolymer (B) having a comonomer content of 4.0 to 20.0 wt. %, the comonomers are $C_5$ to $C_{12}$ α-olefins, and
(c) a low-crystalline polymer (C) having a melting temperature in the range of 50 to 100 ° C. and a heat of fusion in the range of 10 to 50 J/g,
wherein further
(i) the weight ratio of the polypropylene (A) to the propylene copolymer (B) is in the range of 20/80 to 80/20,
(ii) the polymer composite comprises 5 to 50 wt. % based on the total amount of polymer composite of low-crystalline polymer (C),
(iii) the low-crystalline polymer (C) has a lower crystallinity than a mixture (M) of the polypropylene (A) and the propylene copolymer (B),
(iv) the low-crystalline polymer (C) is a propylene-ethylene copolymer comprising ethylene as comonomer,
(v) the polymer composite has a melting temperature in the range of 145 to 163° C., and
(vi) the polymer composite has a heat sealing initiation temperature (SIT) of not more than 110° C.

2. Polymer composite according to claim 1, wherein the mixture (M) of the polypropylene (A) and the propylene copolymer (B) has:
a comonomer content of at least 2.5 wt. % the comonomers are $C_5$ to $C_{12}$ α-olefins.

3. Polymer composite according to claim 1, wherein the mixture (M) of the polypropylene (A) and the propylene copolymer (B) has:
(a) a melt flow rate $MFR_2$ (230° C.) measured according to ISO 133 in the range of 1.0 to 50.0 g/10 min, and/or
(b) a xylene soluble content (XCS) determined at 23° C. according to ISO 6427 of below 15 wt. %.

4. Polymer composite comprising:
(a) propylene copolymer composition (P) having a comonomer content in the range of 2.5 to 10 wt. %, the comonomers are $C_5$ to $C_{12}$ α-olefins, and
(b) a low-crystalline polymer (C) having a melting temperature in the range of 50 to 100 ° C. and a heat of fusion in the range of 10 to 50 J/g the low-crystalline polymer (C) is a propylene-ethylene copolymer comprising ethylene as comonomer, and wherein further said polymer composite has, (i) a melting temperature of at least 145° C.,
(ii) a heat sealing initiation temperature (SIT) of not more than 110° C., and
(iii) the polymer composite comprises 5 to 50 wt. % based on the total amount of polymer composite of low-crystalline polymer (C).

5. Polymer composite according to claim 4, wherein the propylene copolymer composition (P) has:
(a) a polypropylene (A) having a comonomer content of below 4.0 wt. %, the comonomers are $C_5$ to $C_{12}$ α-olefins, and
(b) a propylene copolymer (B) having a comonomer content of 4.0 to 20.0 wt. %, the comonomers are $C_5$ to $C_{12}$ α-olefins,
wherein further the weight ratio of the polypropylene (A) to the propylene copolymer (B) is in the range of 20/80 to 80/20.

6. Polymer composite according to claim 4, wherein:
(a) propylene copolymer composition (P) comprises:
   (a1) a polypropylene (A) having a comonomer content of below 4.0 wt. %, the comonomers are $C_5$ to $C_{12}$ α-olefins, and
   (a2) a propylene copolymer (B) having a comonomer content of 4.0 to 20.0 wt. %, the comonomers are $C_5$ to $C_{12}$ α-olefins,
(b) the weight ratio of the polypropylene (A) to the propylene copolymer (B) is in the range of 20/80 to 80/20, and
(c) the low-crystalline polymer (C) has a lower crystallinity than a mixture (M) of the polypropylene (A) and the propylene copolymer (B).

7. Polymer composite according to claim 4, wherein the propylene copolymer composition (P) has:
(a) a melt flow rate $MFR_2$ (230° C.) measured according to ISO 1133 in the range of 1.0 to 50.0 g/10 min, and/or
(b) a xylene soluble content (XCS) determined at 23° C. according to ISO 6427 of below 15 wt. %.

8. Polymer composite according to claim 1, wherein the polymer composite has:
(a) a hot tack force of at least 3.0 N, and/or
(b) fulfills the equation (Ib)

$$Tm-SIT \geq 40° C.$$

wherein
SIT is the heat sealing initiation temperature (SIT) given in centigrade [° C.] of the polymer composite, and
Tm is the melting temperature given in centigrade [° C.] of the polymer composite.

9. Polymer composite according to claim 1, wherein the polypropylene (A):
(a) is a propylene homopolymer, and/or
(b) has a melt flow rate $MFR_2$ (230° C.) measured according to ISO 1133 of not more than 15.0 g/10 min, and/or
(c) has a xylene soluble content (XCS) of below 2.0 wt. %.

10. Polymer composite according to claim 1, wherein the propylene copolymer (B):
(a) comprises 1-hexene as comonomer, and/or
(b) has a melt flow rate $MFR_2$ (230° C.) measured according to ISO 1133 of more than 4 g/10min.

11. Polymer composite according to claim 1, wherein the comonomer content of the low-crystalline polymer (C) is in the range of 7 to 20 wt. %.

12. Polymer composite according to claim 1, wherein the low-crystalline polymer (C) has:
(a) a melt flow rate $MFR_2$ (230° C.) measured according to ISO 1133 in the range of 1 to 40 g/10 min, and/or
(b) a density of below 910 kg/m³.

13. Polymer composite according to claim 1, being provided as a film.

14. Polymer composite according claim 1, being provided as a coating for an extrusion coated substrate.

* * * * *